United States Patent
Guerin et al.

(10) Patent No.: US 8,858,825 B2
(45) Date of Patent: *Oct. 14, 2014

(54) HEAT TRANSFER COMPOSITIONS COMPRISING 2,3,3,3-TETRAFLUOROPROPENE AND AMMONIA

(71) Applicant: Arkema France, Colombes (FR)

(72) Inventors: Sophie Guerin, Francheville (FR); Wissam Rached, Chaponost (FR)

(73) Assignee: Arkema France, Colombes (FR)

( * ) Notice: Subject to any disclaimer, the term of this patent is extended or adjusted under 35 U.S.C. 154(b) by 0 days.

This patent is subject to a terminal disclaimer.

(21) Appl. No.: 13/749,840

(22) Filed: Jan. 25, 2013

(65) Prior Publication Data
US 2013/0186114 A1   Jul. 25, 2013

(30) Foreign Application Priority Data

Jan. 25, 2012 (FR) .................................... 12 50718

(51) Int. Cl.
*C09K 5/04* (2006.01)
*F25B 30/02* (2006.01)
*C10M 171/00* (2006.01)

(52) U.S. Cl.
CPC ................ *C09K 5/045* (2013.01); *F25B 30/02* (2013.01); *C10M 2209/108* (2013.01); *C10M 171/008* (2013.01); *C09K 2205/126* (2013.01); *C10N 2230/64* (2013.01); *C09K 2205/132* (2013.01); *C10M 2209/103* (2013.01); *C10N 2220/302* (2013.01); *C10N 2220/305* (2013.01)

USPC .............................................. 252/68; 252/67

(58) Field of Classification Search
USPC ...................................................... 252/67, 68
See application file for complete search history.

(56) References Cited

U.S. PATENT DOCUMENTS

| | | | |
|---|---|---|---|
| 5,595,678 | A | 1/1997 | Short et al. |
| 2004/0089839 | A1 | 5/2004 | Thomas et al. |
| 2006/0243945 | A1* | 11/2006 | Minor et al. .................... 252/67 |
| 2009/0241562 | A1 | 10/2009 | Thomas et al. |
| 2009/0302264 | A1 | 12/2009 | Serrano et al. |
| 2012/0205574 | A1 | 8/2012 | Rached et al. |
| 2014/0008565 | A1 | 1/2014 | Rached |

FOREIGN PATENT DOCUMENTS

| | | |
|---|---|---|
| EP | 0 490 810 A1 | 6/1992 |
| WO | WO 2007/126414 A2 | 11/2007 |
| WO | WO 2008/009922 A2 | 1/2008 |
| WO | WO 2008/009928 A2 | 1/2008 |

* cited by examiner

*Primary Examiner* — John Hardee
(74) *Attorney, Agent, or Firm* — Buchanan Ingersoll & Rooney P.C.

(57) ABSTRACT

The invention relates to a composition comprising:
a heat-transfer fluid comprising from 15% to 30% ammonia and from 70% to 85% 2,3,3,3-tetrafluoropropene; and
a lubricant oil comprising a polyalkylene glycol.
The invention also relates to the use of ammonia for increasing the miscibility of 2,3,3,3-tetrafluoropropene with the polyalkylene glycol, and vice versa.

28 Claims, 2 Drawing Sheets

HEAT TRANSFER COMPOSITIONS COMPRISING 2,3,3,3-TETRAFLUOROPROPENE AND AMMONIA

FIELD OF THE INVENTION

The present invention relates to heat-transfer compositions based on 2,3,3,3-tetrafluoropropene which have improved miscibility with lubricant oil.

TECHNOLOGICAL BACKGROUND

Fluids based on fluorocarbon compounds are widely used in systems of heat transfer by vapour compression, especially air conditioning, heat pump, refrigeration or freezing devices. The common feature of these devices is that they are based on a thermodynamic cycle comprising the vaporization of fluid at low pressure (in which the fluid absorbs heat); compression of the vaporized fluid up to a high pressure; condensation of the vaporized fluid to liquid at high pressure (in which the fluid expels heat); and depressurization of the fluid to complete the cycle.

The choice of a heat-transfer fluid (which may be a pure compound or a mixture of compounds) is dictated, on the one hand, by the thermodynamic properties of the fluid, and, on the other hand, by additional constraints. Thus, a particularly important criterion is that of the impact of the fluid under consideration on the environment. In particular, chlorinated compounds (chlorofluorocarbons and hydrochlorofluorocarbons) have the drawback of damaging the ozone layer. Non-chlorinated compounds such as hydrofluorocarbons, fluoroethers and fluoroolefins are therefore now generally preferred.

Another environmental constraint is that of the global warming potential (GWP). It is therefore essential to develop heat-transfer compositions that have a GWP that is as low as possible and good energy performance.

Moreover, to lubricate the moving parts of the compressor (or compressors) of a vapour compression system, a lubricant oil must be added to the heat-transfer fluid. The oil may generally be mineral or synthetic.

The choice of the lubricant oil is made as a function of the type of compressor, so as not to react with the heat-transfer fluid itself and with the other components present in the system.

For certain heat-transfer systems (especially of small size), the lubricant oil is generally permitted to circulate throughout the circuit, the pipework being designed such that the oil can flow by gravity to the compressor. In other heat-transfer systems (especially of large size), an oil separator is provided immediately after the compressor, as is a device for controlling the oil level, which returns the oil to the compressor(s). Even when an oil separator is present, the pipework of the system must still be designed so that the oil can return by gravity to the oil separator or to the compressor.

Document WO 2004/037 913 describes compositions based on fluoroolefins and especially based on tetrafluoropropene or pentafluoropropene. Example 2 reports the miscibility of 1,2,3,3,3-pentafluoropropene (HFO-1225ye) with various lubricant oils, and also that of 1,3,3,3-tetrafluoropropene (HFO-1234ze) with various lubricant oils. Example 3 reports the compatibility of HFO-1234ze and of 3,3,3-trifluoropropene (HFO-1243zf) with lubricant oils such as polyalkylene glycols.

Document WO 2005/042 663 specifically concerns the miscibility of mixtures of fluoroolefins and of lubricant oils. The examples provided for these mixtures are essentially the same as those of document WO 2004/037 913.

Document WO 2006/094 303 describes a large number of heat-transfer compositions comprising fluoroolefins, and especially 2,3,3,3-tetrafluoropropene (HFO-1234yf), and additional compounds. Moreover, the document generally teaches combining the list of the numerous possible refrigerant mixtures with a list of lubricant oils.

Document WO 2007/126 414 describes a large number of mixtures of heat-transfer compounds, and especially mixtures comprising 2,3,3,3-tetrafluoropropene (HFO-1234yf) and ammonia. The document also teaches the addition of any lubricant chosen from a list of conventional lubricants.

Documents WO 2008/009 928 and WO 2008/009 922 describe heat-transfer compositions based on pentafluoropropene, tetrafluoropropene and at least one additional compound, which may be ammonia.

Document US 2006/0 243 945 describes a large number of mixtures of heat-transfer compounds, and especially quaternary compositions based on HFO-1234yf, ammonia, difluoromethane (HFC-32) and trifluoroiodomethane. A generic list of possible lubricants is cited.

When the heat-transfer compound(s) are of poor miscibility with the lubricant oil, this oil tends to be trapped in the evaporator and not return to the compressor, which prevents correct functioning of the system.

In this regard, there is still a need to develop heat-transfer compositions with a low GWP (which have good energy performance), in which the heat-transfer compounds show good miscibility with the lubricant oil.

In particular, HFO-1234yf is a heat-transfer compound that is very advantageous especially on account of its low GWP and its good energy performance. On the other hand, its miscibility with certain lubricant oils such as polyalkylene glycol oils is imperfect and limits its application. It is thus desirable to improve the miscibility of compositions based on HFO-1234yf with the usual lubricant oils.

SUMMARY OF THE INVENTION

The invention relates firstly to a composition comprising:
a heat-transfer fluid comprising from 15% to 30% ammonia and from 70% to 85% 2,3,3,3-tetrafluoropropene; and
a lubricant oil comprising a polyalkylene glycol.

According to one embodiment, the heat-transfer fluid consists of a mixture of ammonia and 2,3,3,3-tetrafluoropropene.

According to one embodiment, the heat-transfer fluid comprises from 18% to 26% ammonia and from 74% to 82% 2,3,3,3-tetrafluoropropene, and preferably from 21% to 23% ammonia and from 77% to 79% 2,3,3,3-tetrafluoropropene.

According to one embodiment, the lubricant oil consists of a polyalkylene glycol.

According to one embodiment, the lubricant oil represents from 1% to 99%, preferably from 5% to 50%, more particularly preferably from 10% to 40% and ideally from 15% to 35% of the composition.

According to one embodiment, the composition also comprises one or more additives chosen from heat-transfer compounds, stabilizers, surfactants, tracers, fluorescers, odourant agents and solubilizers, and mixtures thereof.

The invention also relates to the use of a polyalkylene glycol as a lubricant oil in a vapour compression circuit, in combination with a heat-transfer fluid comprising from 15% to 30% ammonia and from 70% to 85% 2,3,3,3-tetrafluoropropene.

According to one embodiment, the polyalkylene glycol is used in a proportion of from 1% to 99%, preferably from 5% to 50%, more particularly preferably from 10% to 40% and ideally from 15% to 35% relative to the sum of the polyalkylene glycol and of the heat-transfer fluid.

According to one embodiment, the heat-transfer fluid comprises from 18% to 26% ammonia and from 74% to 82% 2,3,3,3-tetrafluoropropene and preferably from 21% to 23% ammonia and from 77% to 79% 2,3,3,3-tetrafluoropropene.

According to one embodiment, the heat-transfer fluid consists of a mixture of ammonia and 2,3,3,3-tetrafluoropropene.

The invention also relates to a heat-transfer installation comprising a vapour compression circuit containing a heat-transfer composition which is a composition as described above.

According to one embodiment, the installation is chosen from mobile or stationary heat-pump heating, air conditioning, refrigeration and freezing installations and Rankine cycles.

According to one embodiment, the installation is a motor vehicle air conditioning installation.

The invention also relates to a process for heating or cooling a fluid or a body by means of a vapour compression circuit containing a heat-transfer fluid, the said process successively comprising the at least partial evaporation of the heat-transfer fluid, compression of the heat-transfer fluid, the at least partial condensation of the heat-transfer fluid and depressurization of the heat-transfer fluid, in which the heat-transfer fluid is combined with a lubricant oil to form a heat-transfer composition, the said heat-transfer composition being a composition as described above.

The invention also relates to a process for reducing the environmental impact of a heat-transfer installation comprising a vapour compression circuit containing an initial heat-transfer fluid, the said process comprising a step of replacing the initial heat-transfer fluid in the vapour compression circuit with a final heat-transfer fluid, the final heat-transfer fluid having a lower GWP than the initial heat-transfer fluid, in which the final heat-transfer fluid is combined with a lubricant oil to form a heat-transfer composition, the said heat-transfer composition being a composition as described above.

The invention also relates to the use of ammonia for increasing the miscibility of 2,3,3,3-tetrafluoropropene with a lubricant oil.

According to one embodiment, ammonia is used in a proportion of from 15% to 30%, preferably from 18% to 26% and more particularly preferably from 21% to 23% relative to the sum of the ammonia and of the 2,3,3,3-tetrafluoropropene.

The invention also relates to the use of 2,3,3,3-tetrafluoropropene for increasing the miscibility of ammonia with a lubricant oil.

According to one embodiment, 2,3,3,3-tetrafluoropropene is used in a proportion of from 70% to 85%, preferably from 74% to 82% and more particularly preferably from 77% to 79% relative to the sum of the ammonia and of the 2,3,3,3-tetrafluoropropene.

According to one embodiment, the lubricant oil comprises, and preferably consists of, a polyalkylene glycol.

The invention also relates to a kit comprising:
a heat-transfer fluid comprising from 15% to 30% ammonia and from 70% to 85% 2,3,3,3-tetrafluoropropene, on the one hand;
a lubricant oil comprising a polyalkylene glycol, on the other hand; for a use in a heat-transfer installation comprising a vapour compression circuit.

The invention also relates to a kit comprising:
ammonia;
2,3,3,3-tetrafluoropropene;
a lubricant oil comprising a polyalkylene glycol;
the amount of ammonia being from 15% to 30% and the amount of 2,3,3,3-tetrafluoropropene being from 70% to 85%, relative to the sum of the ammonia and of the 2,3,3,3-tetrafluoropropene, for a use in a heat-transfer installation comprising a vapour compression circuit.

According to one embodiment, the lubricant oil consists of a polyalkylene glycol.

According to one embodiment, the above kits are for a use in a motor vehicle air conditioning installation.

The present invention makes it possible to satisfy the needs existing in the prior art. It more particularly provides heat-transfer compositions with a low GWP, which have good energy performance, and in which the heat-transfer compounds show good miscibility with the lubricant oil.

In particular, the invention provides heat-transfer compositions based on HFO-1234yf, which show improved miscibility with lubricant oils based on polyalkylene glycols.

This is accomplished by mixing HFO-1234yf with ammonia ($NH_3$). Thus, the present inventors have observed that ammonia improves the miscibility properties of HFO-1234yf with polyalkylene glycols, especially at temperatures above 25° C.

Oils of polyalkylene glycol type have good lubricant power, a low flowpoint, good fluidity at low temperature, and good compatibility with the elastomers generally present in a vapour compression circuit. They are moreover relatively less expensive than other lubricant oils, and are oils whose use is currently very widespread in certain fields, and especially in the field of motor vehicle air conditioning. It is thus very advantageous to improve the miscibility of HFO-1234yf with a lubricant oil of polyalkylene glycol type, so as to be able to use this heat-transfer compound to a larger extent in combination with this lubricant oil, especially without the need for mechanical techniques to ensure the return of oil in the compressors.

Reciprocally, it has been found that HFO-1234yf improves the miscibility properties of ammonia with polyalkylene glycols, especially at temperatures below 30° C.

Ammonia and HFO-1234yf therefore have synergistic properties as regards the miscibility with polyalkylene glycols.

Figure 1:
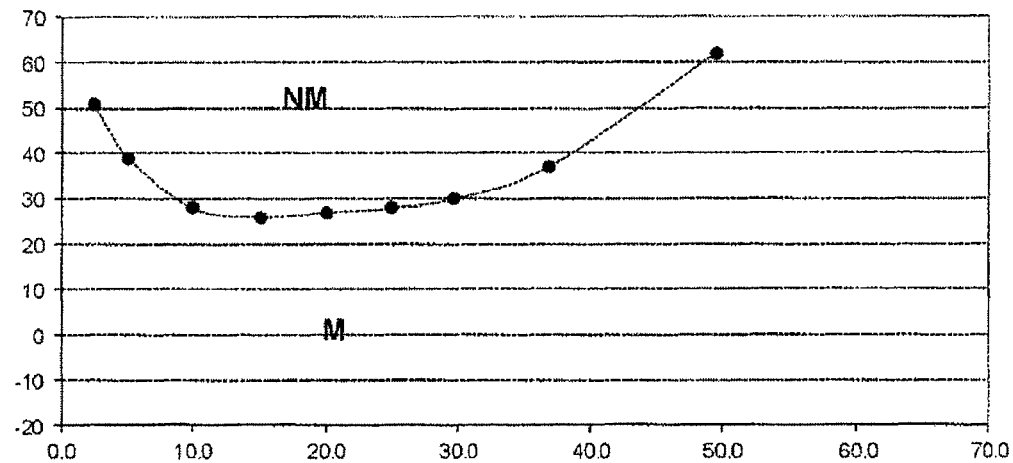
FIG. 1 is a graph showing the threshold temperature of non-miscibility of HFO-1234yf with a polyalkylene glycol oil (in ° C., on the y-axis) as a function of the relative proportion of oil in the HFO-1234yf (in %, on the x-axis).

In these graphs, the miscibility zone is noted M and the non-miscibility zone is noted NM.

DESCRIPTION OF EMBODIMENTS OF THE INVENTION

The invention is now described in greater detail and in a non-limiting manner in the description that follows.

Unless otherwise mentioned, throughout the application, the proportions of compounds indicated are given as mass percentages.

According to the present application, the global warming potential (GWP) is defined relative to carbon dioxide and relative to a period of 100 years, according to the method indicated in *"The scientific assessment of ozone depletion, 2002, a report of the World Meteorological Association's Global Ozone Research and Monitoring Project"*.

The term "heat-transfer compound" or, respectively, "heat-transfer fluid" (or coolant fluid) means a compound or, respectively, a fluid that is capable of absorbing heat by evaporating at low temperature and low pressure and of expelling heat by condensing at high temperature and high pressure, in a vapour compression circuit. In general, a heat-transfer fluid may comprise one, two, three or more than three heat-transfer compounds.

The term "heat-transfer composition" means a composition comprising a heat-transfer fluid and optionally one or more additives that are not heat-transfer compounds for the intended application.

The invention is based on the use of two heat-transfer compounds, namely HFO-1234yf and ammonia, and of a lubricant oil, to form a heat-transfer composition.

The heat-transfer composition may be introduced in its native form into a vapour compression circuit. Alternatively, the heat-transfer fluid (comprising HFO-1234yf and ammonia), on the one hand, and the lubricant oil, on the other hand, may be introduced separately into the circuit, at the same point or otherwise. The individual heat-transfer compounds (HFO-1234yf and ammonia) may also be introduced separately.

The lubricant oil is preferably of the polyalkylene glycol type.

For the purposes of the invention, the polyalkylene glycol may comprise polyalkylene glycols of different formulae as a mixture.

In general, the polyalkylene glycol that is suitable for use in the context of the invention comprises from 5 to 50 repeating oxyalkylene units, each containing from 1 to 5 carbon atoms.

The polyalkylene glycol may be linear or branched. It may be a homopolymer or a copolymer of 2, 3 or more than 3 groups chosen from oxyethylene, oxypropylene, oxybutylene and oxypentylene groups and combinations thereof.

Preferred polyalkylene glycols comprise at least 50% of oxypropylene groups.

Suitable polyalkylene glycols are described in document U.S. Pat. No. 4,971,712. Other suitable polyalkylene glycols are polyalkylene glycols containing hydroxyl groups at each end, as described in document U.S. Pat. No. 4,755,316. Other suitable polyalkylene glycols are polyalkylene glycols bearing a capped hydroxyl end. The hydroxyl group may be capped with an alkyl group containing from 1 to 10 carbon atoms (and optionally containing one or more heteroatoms such as nitrogen), or a fluoroalkyl group containing heteroatoms such as nitrogen, or a fluoroalkyl group as described in document U.S. Pat. No. 4,975,212, or other similar groups.

When the two hydroxyl ends of the polyalkylene glycol are capped, the same end group or a combination of two different groups may be used.

The hydroxyl end groups may also be capped by forming an ester with a carboxylic acid, as is described in document U.S. Pat. No. 5,008,028. The carboxylic acid may also be fluorinated.

When the two ends of the polyalkylene glycol are capped, one or the other may be capped with an ester, or alternatively one end may be capped with an ester and the other end may be free or may be capped with one of the abovementioned alkyl, heteroalkyl or fluoroalkyl groups.

Polyalkylene glycols that may be used as lubricant oils and that are commercially available are, for example, the oils Goodwrench from General Motors, MOPAR-56 from Daimler-Chrysler, Zerol from Shrieve Chemical Products, Planetelf PAG from Total and Daphne Hermetic PAG from Itemitsu. Other suitable polyalkylene glycols are manufactured by Dow Chemical and Denso. Mention may also be made of the oils manufactured by Fuchs and especially the oil REN-ISO PG 68/NH3.

The viscosity of the polyalkylene glycol may be, for example, from 1 to 1000 centistokes at 40° C., preferably from 10 to 200 centistokes at 40° C. and more particularly preferably from 30 to 80 centistokes at 40'C.

The viscosity is determined according to the ISO viscosity grades, in accordance with standard ASTM D2422.

The oil sold by Denso under the name NDB, with a viscosity of 46 centistokes, is particularly suitable.

The proportion of lubricant oil that is to be used in combination with the heat-transfer fluid depends mainly on the type of installation concerned, Specifically, the total amount of lubricant oil in the installation depends mainly on the nature of the compressor, whereas the total amount of heat-transfer fluid in the installation depends mainly on the exchangers and the pipework.

In general, the proportion of lubricant oil in the heat-transfer composition, or in other words relative to the sum of the lubricant oil and of the heat-transfer fluid, is from 1% to 99%, preferably from 5% to 50%, for example from 10% to 40% or from 15% to 35%, According to one particular embodiment, the lubricant oil used consists of the polyalkylene glycol described above, with the exception of any other lubricant compound.

According to an alternative embodiment, another lubricant oil is used in combination with the polyalkylene glycol. It may be chosen especially from oils of mineral origin, silicone oils, paraffins of natural origin, naphthenes, synthetic paraffins, alkylbenzenes, poly-α-olefins, polyol esters and/or polyvinyl ethers. Polyol esters and polyvinyl ethers are preferred. When another lubricant oil is used in combination with the polyalkylene glycol, it is desirable for the miscibility of HFO-1234yf and/or of ammonia with this oil to be greater than the respective miscibility of HFO-1234yf and/or of ammonia with the polyalkylene glycol.

The heat-transfer compounds mainly used in the context of the present invention are HFO-1234yf and ammonia.

However, the heat-transfer compositions according to the invention may optionally comprise one or more additional heat-transfer compounds, besides HFO-1234yf and ammonia. These additional heat-transfer compounds may be chosen especially from hydrocarbons, hydrofluorocarbons, ethers, hydrofluoroethers and fluoroolefins.

According to particular embodiments, the heat-transfer fluids according to the invention may be ternary compositions (consisting of three heat-transfer compounds) or quaternary compositions (consisting of four heat-transfer compounds), in combination with the lubricant oil to form the heat-transfer compositions according to the invention.

However, binary heat-transfer fluids are preferred.

The term "binary fluid" means either a fluid consisting of a mixture of HFO-1234yf and ammonia; or a fluid consisting essentially of a mixture of HFO-1234yf and ammonia, but which may contain impurities in a proportion of less than 1%, preferably less than 0.5%, preferably less than 0.1%, preferably less than 0.05% and preferably less than 0.01%.

According to particular embodiments, the proportion of HFO-1234yf in the heat-transfer fluid may be: from 0.1% to 5%; or from 5% to 10%; or from 10% to 15%; or from 15% to 20%; or from 20% to 25%; or from 25% to 30%; or from 30% to 35%; or from 35% to 40%; or from 40% to 45%; or from 45% to 50%; or from 50% to 55%; or from 55% to 60%; or from 60% to 65%; or from 65% to 70%; or from 70% to 75%; or from 75% to 80%; or from 80% to 85%; or from 85% to 90%; or from 90% to 95%; or from 95% to 99.9%.

According to particular embodiments, the proportion of ammonia in the heat-transfer fluid may be: from 0.1% to 5%; or from 5% to 10%; or from 10% to 15%; or from 15% to 20%; or from 20% to 25%; or from 25% to 30%; or from 30% to 35%; or from 35% to 40%; or from 40% to 45%; or from 45% to 50%; or from 50% to 55%; or from 55% to 60%; or from 60% to 65%; or from 65% to 70%; or from 70% to 75%; or from 75% to 80%; or from 80% to 85%; or from 85% to 90%; or from 90% to 95%; or from 95% to 99.9%.

The values given in the three preceding paragraphs apply to the heat-transfer fluid without the lubricant oil, and not to the heat-transfer composition which comprises the heat-transfer fluid, lubricant oil and optionally other additives.

It may be preferable not to have an excessively high proportion of $NH_3$ in the mixture, in the context of a use as a heat-transfer fluid, so as to avoid an excessively high temperature increase at the compressor outlet.

Among the heat-transfer fluids above, some have the advantage of being azeotropic or quasi-azeotropic. For example, it has been found that the azeotrope for the HFO-1234yf/$NH_3$ binary mixture is obtained for a proportion of $NH_3$ of about 23% (±2%), at a temperature of 5° C. (±1° C.) and at a pressure of 7.3 bar (±1 bar).

The term "quasi-azeotropic" denotes compositions for which, at a constant temperature, the liquid saturation pressure and the vapour saturation pressure are virtually identical (the maximum pressure difference being 10%, or even advantageously 5% relative to the liquid saturation pressure).

For "azeotropic" compositions, at a constant temperature, the maximum pressure difference is in the region of 0%.

These heat-transfer fluids have an advantage of ease of use. In the absence of significant temperature sliding, there is no significant change in the circulating composition, nor is there any significant change in the composition in the event of a leak.

In addition, it has been found that certain compositions according to the invention show improved performance relative to R404A (mixture of 52% 1,1,1-trifluoroethane, 44% pentafluoroethane and 4% 1,1,1,2-tetrafluoroethane) and/or to R410A (mixture of 50% difluoromethane and 50% pentafluoroethane), in particular for cooling processes at moderate temperature, i.e. those in which the temperature of the cooled fluid or body is from −15° C. to 15° C., preferably from −10° C. to 10° C. and more particularly preferably from −5° C. to 5° C. (ideally about 0° C.). In this regard, the compositions for which the proportion of $NH_3$ is greater than or equal to 15% are particularly preferred, especially compositions with a proportion of $NH_3$ of from 15% to 30% and preferably from 18% to 26%.

It has also been found that certain compositions according to the invention show better performance than R410A, in particular for heating processes at moderate temperature, i.e. those in which the temperature of the heated fluid or body is from 30° C. to 80° C., preferably from 35° C. to 55° C. and more particularly preferably from 40° C. to 50° C. (ideally about 45° C.). In this regard, compositions for which the proportion of $NH_3$ is greater than or equal to 15% are particularly preferred, especially compositions with a proportion of $NH_3$ of from 20% to 30%.

The other additives that may be used in the context of the invention may be chosen especially from stabilizers, surfactants, tracers, fluorescers, odourant agents and solubilizers.

The stabilizer(s), when they are present, preferably represent not more than 5% by mass in the heat-transfer composition. Among the stabilizers that may especially be mentioned are nitromethane, ascorbic acid, terephthalic acid, azoles such as tolutriazole or benzotriazole, phenolic compounds such as tocopherol, hydroquinone, t-butyl hydroquinone, 2,6-di-tert-butyl-4-methylphenol, epoxides (optionally fluorinated or perfluorinated alkyl or alkenyl or aromatic) such as n-butyl glycidyl ether, hexanediol diglycidyl ether, allyl glycidyl ether or butylphenyl glycidyl ether, phosphites, phosphonates, thiols and lactones.

Tracers (capable of being detected) that may be mentioned include deuterated or non-deuterated hydrofluorocarbons, deuterated hydrocarbons, perfluorocarbons, fluoroethers, brominated compounds, iodinated compounds, alcohols, aldehydes, ketones, nitrous protoxide, and combinations thereof. The tracer is different from the heat-transfer compound(s) of which the heat-transfer fluid is composed.

Solubilizers that may be mentioned include hydrocarbons, dimethylether, polyoxyalkylene ethers, amides, ketones, nitriles, chlorocarbons, esters, lactones, aryl ethers, fluoroethers and 1,1,1-trifluoroalkanes. The solubilizer is different from the heat-transfer compound(s) of which the heat-transfer fluid is composed.

Fluorescers that may be mentioned include naphthalimides, perylenes, coumarins, anthracenes, phenanthracenes, xanthenes, thioxanthenes, naphthoxanthenes, fluoresceins, and derivatives and combinations thereof.

Odourant agents that may be mentioned include alkylacrylates, allylacrylates, acrylic acids, acryl esters, alkyl ethers, alkyl esters, alkynes, aldehydes, thiols, thioethers, disulfides, allylisothiocyanates, alkanoic acids, amines, norbornenes, norbornene derivatives, cyclohexene, heterocyclic aromatic compounds, ascaridole, o-methoxy(methyl)phenol and combinations thereof.

The heat-transfer process according to the invention is based on the use of an installation comprising a vapour compression circuit that contains a heat-transfer composition (namely a heat-transfer fluid and at least one lubricant oil).

The heat-transfer process may be a process of heating or cooling a fluid or a body.

The vapour compression circuit comprises at least one evaporator, a compressor, a condenser and a depressurizer, and also lines for transporting fluid between these elements. The evaporator and the condenser comprise a heat exchanger that allows an exchange of heat between the heat-transfer fluid and another fluid or body.

A compressor that may especially be used is a centrifugal compressor with one or more stages or a centrifugal mini-compressor. Rotary compressors, with a piston or a screw, may also be used. The compressor may be driven by an electric motor or by a gas turbine (for example fed with the exhaust gases of a vehicle, for mobile applications) or by gearing.

The installation may comprise a turbine to generate electricity (Rankine cycle), The installation may also optionally comprise at least one heat-exchange fluid circuit used to transmit heat (with or without change of state) between the heat-transfer fluid circuit and the fluid or body to be heated or cooled.

The installation may also optionally comprise two (or more) vapour compression circuits, containing identical or different heat-transfer fluids. For example, the vapour compression circuits may be coupled together.

The vapour compression circuit functions according to a standard vapour compression cycle. The cycle comprises the change of state of the heat-transfer fluid from a liquid phase (or liquid/vapour two-phase state) to a vapour phase at a relatively low pressure, followed by compression of the fluid in the vapour phase to a relatively high pressure, the change of state (condensation) of the heat-transfer fluid from the vapour phase to the liquid phase at a relatively high pressure, and reduction of the pressure to recommence the cycle.

In the case of a cooling process, the heat derived from the fluid or body that is cooled (directly or indirectly, via a heat-exchange fluid) is absorbed by the heat-transfer fluid, during its evaporation, this taking place at a relatively low temperature relative to the environment. The cooling processes comprise air conditioning processes (with mobile installations, for example in vehicles, or stationary installations), refrigeration and freezing or cryogenic processes.

In the case of a heating process, heat is yielded (directly or indirectly, via a heat-exchange fluid) from the heat-transfer fluid, during its condensation, to the fluid or body that is heated, this taking place at a relatively high temperature relative to the environment. The installation for performing heat transfer is referred to in this case as a "heat pump".

It is possible to use any type of heat exchanger for the use of the heat-transfer fluids according to the invention, and especially co-current heat exchangers or, preferably, counter-current heat exchangers. It is also possible to use microchannel exchangers.

The invention makes it possible in particular to perform cooling processes at moderate temperature, i.e. in which the temperature of the cooled fluid or body is from −15° C. to 15° C., preferably from −10° C. to 10° C. and more particularly preferably from −5° C. to 5° C. (ideally about 0° C.).

The invention also makes it possible to perform heating processes at moderate temperature, i.e, in which the temperature of the heated fluid or body is from 30° C. to 70° C., preferably from 35° C. to 55° C. and more particularly preferably from 40° C. to 50° C. (ideally about 45° C.).

In the processes of "cooling or heating at moderate temperature" mentioned above, the inlet temperature of the heat-transfer fluid into the evaporator is preferably from −20° C. to 10° C., especially from −15° C. to 5° C. and more particularly preferably from −10° C. to 0° C., for example about −5° C.; and the temperature of the start of condensation of the heat-transfer fluid in the condenser is preferably from 25° C. to 80° C., especially from 30° C. to 70° C., more particularly preferably from 35° C. to 55° C., for example about 50° C. These processes may be refrigeration, air conditioning or heating processes.

According to one preferred embodiment, the heat-transfer fluid is, throughout the cycle, at a temperature at which it is miscible with the lubricant oil. For example, the heat-transfer fluid is, throughout the cycle, at a temperature of between −20° C. and 70° C.

It should be noted that the addition of ammonia to a heat-transfer fluid consisting of HFO-1234yf (or comprising HFO-1234yf) improves the miscibility of the heat-transfer fluid with the lubricant oil, in the sense that it increases the threshold temperature of appearance of the non-miscibility zone (defined, for HFO-1234yf, as being the temperature above which the compounds in liquid phase form an emulsion), and thus makes it possible to increase the possibilities of use of the heat-transfer fluid, for example with a use at a higher condensation temperature.

Conversely, the addition of HFO-1234yf to a heat-transfer fluid consisting of ammonia (or comprising ammonia) improves the miscibility of the heat-transfer fluid with the lubricant oil, i.e. reduces the threshold temperature of appearance of the non-miscibility zone (defined, for ammonia, as being the temperature below which the compounds in liquid phase form an emulsion), and thus makes it possible to increase the possibilities of use of the heat-transfer fluid, for example with a use at a lower evaporation temperature.

More generally, the invention makes it possible to replace any heat-transfer fluid in all the heat-transfer applications, and, for example, in motor vehicle air conditioning. For example, the heat-transfer fluids and the heat-transfer compositions according to the invention may serve to replace:
- 1,1,1,2-tetrafluoroethane (R134a);
- 1,1-difluoroethane (R152a);
- 1,1,1,3,3-pentafluoropropane (R245fa);
- mixtures of pentafluoroethane (R125), 1,1,1,2-tetrafluoroethane (R134a) and isobutane (R600a), namely R422;
- chlorodifluoromethane (R22);
- the mixture of 51.2% chloropentafluoroethane (R115) and 48.8% chlorodifluoromethane (R22), namely R502;
- any hydrocarbon;
- the mixture of 20% difluoromethane (R32), 40% pentafluoroethane (R125) and 40% 1,1,1,2-tetrafluoroethane (R134a), namely R407A;
- the mixture of 23% difluoromethane (R32), 25% pentafluoroethane (R125) and 52% 1,1,1,2-tetrafluoroethane (R134a), namely R407c;
- the mixture of 30% difluoromethane (R32), 30% pentafluoroethane (R125) and 40% 1,1,1,2-tetrafluoroethane (R134a), namely R407F;
- R1234yf (2,3,3,3-tetrafluoropropene);
- R1234ze (1,3,3,3-tetrafluoropropene).

EXAMPLE

The example that follows illustrates the invention without limiting it.

In this example, the miscibility of HFO-1234yf, ammonia and of the azeotropic mixture of HFO-1234yf and ammonia with a lubricant oil of polyalkylene glycol type (PAG) ND8 is studied.

An autoclave is placed in a glass tank, fed with a thermostatically maintained bath of water or of glycol-water according to the test temperatures, of from −30° C. to +80° C.

For each experiment, the heat-transfer fluid is introduced into the autoclave. Next, a defined first amount of lubricant oil is added, and the mixture is stirred. The temperature in the autoclave is raised until an emulsion is obtained, indicating the non-miscibility of the mixture. Next, the mixture is cooled, a further amount of oil is introduced into the mixture, and the process is repeated.

This procedure makes it possible to plot, for each transfer fluid, a curve displaying the non-miscibility zone of the mixture with the oil PAG, as a function of the temperature.

Figure 2:
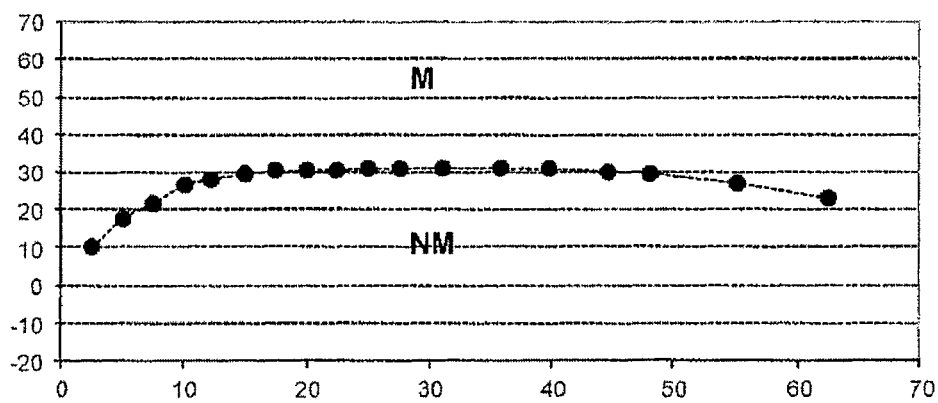
FIG. 2 is a graph showing the threshold temperature of non-miscibility of ammonia with a polyalkylene glycol oil (in ° C., on the y-axis) as a function of the relative proportion of oil in the ammonia (in %, on the x-axis).
Figure 3:
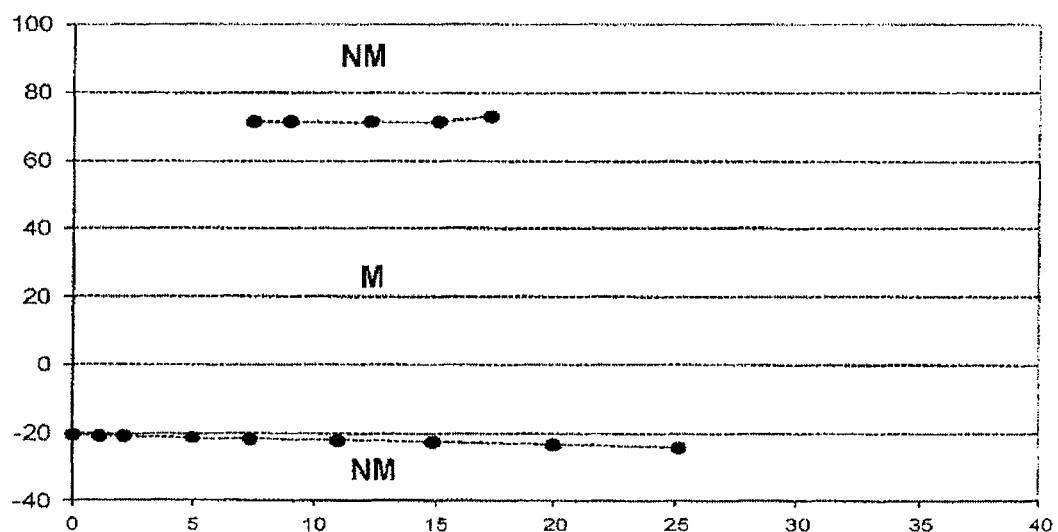
FIG. 3 is a graph showing the threshold temperatures (upper and lower) of non-miscibility of an HFO-1234yf/ammonia mixture with a polyalkylene glycol oil (in ° C., on the y-axis), as a function of the relative proportion of oil in the HFO-1234yf/ammonia mixture (in %, on the x-axis).

The results are shown in FIG. 1 as regards pure HFO-1234yf, in FIG. 2 as regards pure ammonia, and FIG. 3 as regards the azeotropic mixture containing 78% HFO-1234yf and 22% ammonia.

Good miscibility of the oil in HFO-1234yf is observed at low temperatures, with, on the other hand, a large non-miscibility zone at temperatures above 25° C.

Good miscibility of the oil in ammonia is observed at high temperatures, with, on the other hand, a large non-miscibility zone at temperatures below 30° C.

The HFO-1234yf/NH$_3$ azeotropic mixture shows improved miscibility with the oil, up to a temperature above 70° C. At very low temperatures (below about −20° C.), the HFO-1234yf/NH$_3$ mixture undergoes demixing and phase separation independently of the presence or absence of oil.

The invention claimed is:

1. Composition comprising:
   a heat-transfer fluid consisting essentially of a quasi-azeotropic or azeotropic composition of from 15% to 30% ammonia and from 70% to 85% 2,3,3,3-tetrafluoropropene; and
   a lubricant oil comprising a polyalkylene glycol, in which the lubricant oil represents from 1% to 99% of the composition.

2. Composition according to claim 1, in which the heat-transfer fluid consists of a mixture of ammonia and 2,3,3,3-tetrafluoropropene.

3. Composition according to claim 1, in which the heat-transfer fluid comprises from 18% to 26% ammonia and from 74% to 82% 2,3,3,3-tetrafluoropropene.

4. Composition according to claim 1, in which the lubricant oil consists of a polyalkylene glycol.

5. Composition according to claim 1, further comprising one or more additives selected from the group consisting of heat-transfer compounds, stabilizers, surfactants, tracers, fluorescers, odourant agents and solubilizers, and mixtures thereof.

6. Heat-transfer installation comprising a vapour compression circuit containing a heat-transfer composition which is a composition according to claim 1.

7. Heat transfer installation according to claim 6, selected from the group consisting of mobile heat-pump heating, or stationary heat-pump heating, air conditioning, refrigeration install freezing installations and Rankine cycles.

8. Heat transfer installation according to claim 6, which is a motor vehicle air conditioning installation.

9. Composition according to claim 1, in which the heat-transfer fluid comprises from 21% to 23% ammonia and from 77% to 79% 2,3,3,3-tetrafluoropropene.

10. Composition according to claim 1, in which the lubricant oil represents from 5% to 50%, of the composition.

11. Composition according to claim 1, in which the lubricant oil represents from 10% to 40% of the composition.

12. Composition according to claim 1, in which the lubricant oil represents from 15% to 35% of the composition.

13. Process for heating or cooling a fluid or a body by means of a vapour compression circuit containing a heat-transfer fluid, the said process successively comprising the at least partial evaporation of the heat-transfer fluid, compression of the heat-transfer fluid, the at least partial condensation of the heat-transfer fluid and depressurization of the heat-transfer fluid, in which the heat-transfer fluid is combined with a lubricant oil to form a heat-transfer composition, the said heat-transfer composition being a composition according to claim 1.

14. Process for reducing the environmental impact of a heat-transfer installation comprising a vapour compression circuit containing an initial heat-transfer fluid, the said process comprising a step of replacing the initial heat-transfer fluid in the vapour compression circuit with a final heat-transfer fluid, the final heat-transfer fluid having a lower GWP than the initial heat-transfer fluid, in which the final heat-transfer fluid is combined with a lubricant oil to form a heat-transfer composition, the said heat-transfer composition being a composition according to claim 1.

15. A vapour compression circuit comprising a polyalkylene glycol lubricant oil in combination with a heat-transfer fluid, the heat-transfer fluid consisting essentially of a quasi-azeotropic or azeotropic composition of from 15% to 30% ammonia and from 70% to 85% 2,3,3,3-tetrafluoropropene, in which the polyalkylene glycol is used in a proportion of from 5% to 50%, relative to the sum of the polyalkylene glycol and of the heat-transfer fluid.

16. Vapour compression circuit according to claim 15, in which the heat-transfer fluid comprises from 18% to 26% ammonia and from 74% to 82% 2,3,3,3-tetrafluoropropene.

17. Vapour compression circuit according to claim 15, in which the heat-transfer fluid consists of a mixture of ammonia and 2,3,3,3-tetrafluoropropene.

18. Vapour compression circuit according to claim 15, in which the polyalkylene glycol is used in a proportion of from 10% to 40% relative to the sum of the polyalkylene glycol and of the heat-transfer fluid.

19. Vapour compression circuit according to claim 15, in which the polyalkylene glycol is used in a proportion of from 15% to 35% relative to the sum of the polyalkylene glycol and of the heat-transfer fluid.

20. Vapour compression circuit according to claim 15, in which the heat-transfer fluid comprises from 21% to 23% ammonia and from 77% to 79% 2,3,3,3-tetrafluoropropene.

21. A method for increasing the miscibility of 2,3,3,3-tetrafluoropropene with a lubricant oil comprising adding ammonia, to result in composition comprising the lubricant oil and a heat-transfer fluid, the heat-transfer fluid consisting essentially of a quasi-azeotropic or azeotropic composition of ammonia and 2,3,3,3-tetrafluoropropene, and in which the lubricant oil is used in a proportion of from 5% to 50%, relative to the sum of the lubricant oil, 2,3,3,3-tetrafluoropropene and ammonia.

22. Method according to claim 21, in which ammonia is used in a proportion of from 15% to 30% relative to the sum of the ammonia and of the 2,3,3,3-tetrafluoropropene.

23. Method according to claim 21, in which the lubricant oil comprises a polyalkylene glycol.

24. Method according to claim 21, in which ammonia is used in a proportion of from 18% to 26% relative to the sum of the ammonia and of the 2,3,3,3-tetrafluoropropene.

25. Method according to claim 21, in which ammonia is used in a proportion of from 21% to 23%-relative to the sum of the ammonia and of the 2,3,3,3-tetrafluoropropene.

26. A method for increasing the miscibility of ammonia with a lubricant oil comprising adding 2,3,3,3-tetrafluoropropene, to result in composition comprising the lubricant oil and a heat-transfer fluid, the heat-transfer fluid consisting essentially of a quasi-azeotropic or azeotropic composition of ammonia and 2,3,3,3-tetrafluoropropene, and in which the lubricant oil is used in a proportion of from 5% to 50%, relative to the sum of the lubricant oil, 2,3,3,3-tetrafluoropropene and ammonia.

27. Method according to claim 26, in which 2,3,3,3-tetrafluoropropene is used in a proportion of from 70% to 85% relative to the sum of the ammonia and of the 2,3,3,3-tetrafluoropropene.

28. Method according to claim 26, in which the lubricant oil comprises a polyalkylene glycol.

* * * * *